Feb. 2, 1926.

C. T. ALLCUTT

MEASURING DEVICE

Filed March 31, 1920

1,571,224

WITNESSES:
J.A. Helsel
J.H. Procter

INVENTOR
Chester T. Allcutt.
BY
Wesley G. Carr
ATTORNEY

Patented Feb. 2, 1926.

1,571,224

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

MEASURING DEVICE.

Application filed March 31, 1920. Serial No. 370,229.

*To all whom it may concern:*

Be it known that I, CHESTER T. ALLCUTT, a citizen of the United States, and a resident of Pittsburgh, in the county of Allegheny and State of Pennsylvania, have invented a new and useful Improvement in Measuring Devices, of which the following is a specification.

My invention relates to measuring systems and particularly to means for measuring the symmetrical components of unbalanced polyphase quantities.

One object of my invention is to provide means whereby standard instruments and transformers may be used for measuring the symmetrical components of an unbalanced polyphase system.

Another object of my invention is to provide a system, of the above indicated character, that shall be simple and inexpensive to construct and effective in its operation.

Letters Patent No. 1,535,593, issued April 28th, 1925, upon the copending application of C. L. Fortescue, L. W. Chubb and J. Slepian, discloses and claims broadly means for determining the symmetrical components of an unbalanced polyphase quantity.

In my present invention, I utilize the broad principles set forth in the above mentioned application, but obviate the necessity for the use of rotating apparatus as disclosed in the above-mentioned application and also reduce the apparatus necessary to obtain the desired result to a minimum of special devices.

In practicing my invention, I provide a standard measuring instrument and two equal impedance devices differing in phase by an angle that depends upon the number of phases in the circuit, which are so connected to the circuit and to the meter that the meter is actuated in accordance with one symmetrical component of a polyphase electrical quantity impressed on the circuit. By changing the connections of the impedances to the circuit, the instrument may be adapted to indicate either the positive or the negative rotational components of the unbalanced quantity. The negative rotational component of the current is a measure of the unbalance of the circuit, and the ratio of the negative rotational current and the positive rotational current is the unbalance factor of the circuit and may be used to compute the charge to be made a customer for energy consumed.

Figure 2:
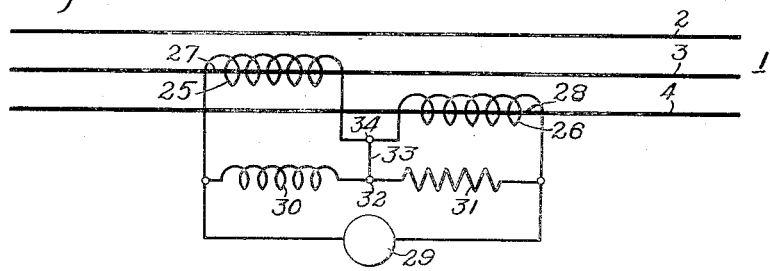
Figure 1:
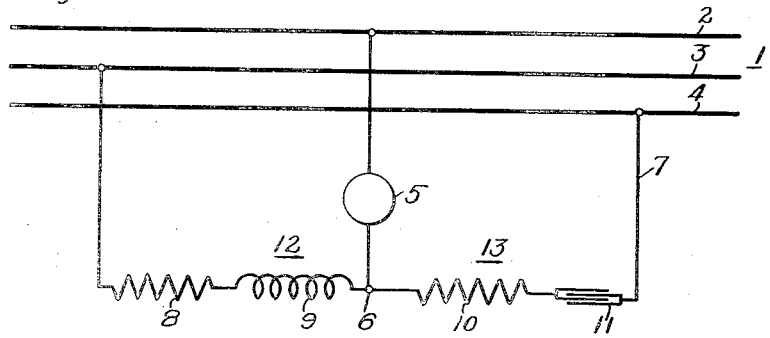

Figure 1 of the accompanying drawings is a diagrammatic view of an electric circuit embodying my invention; Fig. 2 is a diagrammatic view of an electric circuit embodying an improved form of my invention for indicating current values, and Fig. 3 is a diagrammatic view of an electric circuit showing an improved form of device for indicating voltage values.

A three-phase circuit 1 comprises conductors 2, 3 and 4 across which an unbalanced voltage is impressed or which is so unequally loaded that the voltage thereacross is unbalanced. A voltmeter 5 is connected between the conductor 2 and a point 6 in a circuit or network 7. The circuit 7 is connected between the conductors 3 and 4 and comprises a resistor 8, a reactor 9, a resistor 10 and a condenser 11. The resistor 8 and the reactor 9 comprise an impedance device 12 the current traversing which is 120° out of phase with respect to the current traversing the impedance device 13 comprising the resistor 10 and the condenser 11. The impedance devices 12 and 13 are of equal impedance. In other words, the network or circuit 7 has the point 6 therein which is at the same potential as the conductor of the circuit other than that to which the network is connected when a balanced polyphase voltage of one direction of phase rotation is applied to the circuit. No current will traverse the instrument 5 under balanced conditions but the instrument 5 will indicate when the circuit is unbalanced and it has been observed that, under this condition, it indicates one symmetrical component of the unbalanced voltage applied to the circuit 1. That is, the instrument 5 will indicate the one rotational component, such as the positive, with the connections as shown in Fig. 1, and another rotational component, such as the negative, when the network 7 is reversed in its connection to the conductors 3 and 4.

In a balanced polyphase system, the negative rotational components of current and voltage are zero. Under these conditions, the impedances 12 and 13 are subjected to equal voltages that are 60° out of phase. Since the impedances 12 and 13 have equal absolute values and differ in phase by 120°, they are traversed by equal currents that are exactly in phase or 180° out of phase, depending upon the phase rotation of the circuit 1 and the connection of the impedances thereto. If the impedances 12 and 13 are so connected that the currents traversing them cancel under balanced conditions, no current will traverse the instrument 5 under such conditions, and under unbalanced conditions, a current that is proportional to the negative rotational component will traverse the instrument. In systems having a different number of phases, the impedances 12 and 13 should differ in phase by the angle necessary to bring the currents traversing the same exactly in phase or 180° out of phase under balanced conditions. In other words, the impedances 12 and 13 differ in phase to a degree that is correlated to the number of phases of the circuit.

Figure 3:
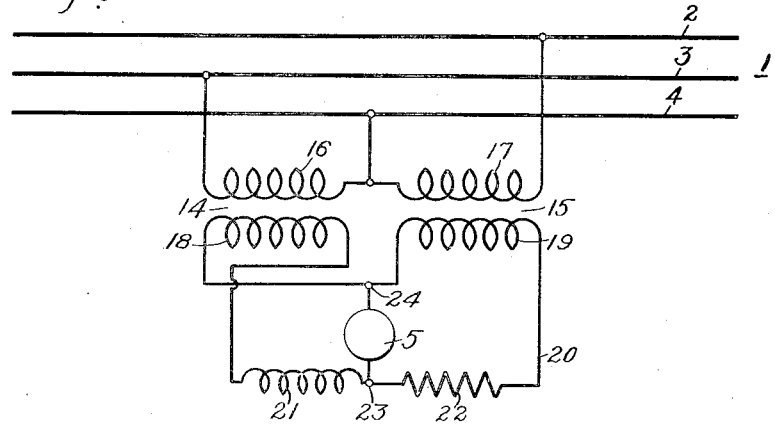

In Fig. 3 of the drawings, two potential transformers 14 and 15 have the primary windings 16 and 17 thereof connected in open delta to the circuit 1. The secondary windings 18 and 19 are connected to a network or circuit 20 comprising impedances 21 and 22 of equal absolute values, the phase angles of the currents traversing which differ by 60°. While the impedance device 22 is shown as non-inductive and the device 21 as inductive, such is not necessary as any impedance devices may be employed having such characteristics that the currents traversing the devices or the voltages thereacross shall be angularly displaced by 60°. The voltmeter 5 is connected from a point 23 intermediate the impedance devices 21 and 22 to a point 24 intermediate the windings 18 and 19 of the transformers. The transformer winding 18 is reversed in its connection in order to so shift the phase-angular relation of the voltage applied to the impedance 21 and the impedance 22 that the same may be 60° out of phase with each other instead of 120° out of phase. This eliminates the necessity of using a condensive reactance. In other words, the impedances 21 and 22 may be relatively small in size which would not be the case if a condenser were used. This is, of course, obtained by the use of the standard instrument transformers 14 and 15. The points 23 and 24 are of the same potential when a balanced voltage of one direction of phase rotation is applied to the circuit, but they are of different potential when an unbalanced voltage is applied to the circuit 1 and, consequently, the meter 5 is traversed by current proportional to one symmetrical component of the unbalanced voltage. This arrangement provides the simplest form of device for obtaining the symmetrical components of the unbalanced polyphase quantities with the use of standard meters and transformers and with the use of relatively small impedance devices.

In Fig. 2 of the drawings, the secondary windings 25 and 26 of series transformers 27 and 28 that are associated with the conductors 3 and 4 of the circuit 1 are connected to a current-measuring instrument 29. Two equal impedance devices 30 and 31 of desired characteristics are connected in series across the instrument 29, and the point 32 therebetween is connected, through a conductor 33, to a point 34 between the windings 25 and 26.

The characteristics of the impedances 30 and 31 are such that when a balanced current traverses the circuit 1, no current traverses the instrument 29 but, when an unbalanced load is impressed on the circuit 1, current traverses the instrument 29 and is a measure of the unbalance of the circuit 1. In other words, the instrument 29 may indicate the positive or negative rotational component of the unbalanced current traversing the circuit 1, depending upon the connection of the transformers 27 and 28. The negative rotational component of the current is a measure of the unbalance of the circuit, and the ratio of the negative rotational current component to the positive rotational current component is the unbalance factor and may be used as a measure for penalizing a customer for taking his load on a single-phase basis, rather than on a balanced polyphase basis. For a different number of phases, the characteristics of the impedances 30 and 31 are so chosen that, when connected to measure the negative rotational component, no current traverses the instrument 29 under balanced conditions.

My invention is not limited to the specific structures illustrated as it may be variously modified without departing from the spirit and scope of the same, as set forth in the appended claims.

I claim as my invention:

1. In a three-phase circuit, the combination with a measuring instrument, of a network connected across two conductors of the circuit of such character that one point of the network is of the same potential as the other conductor of the circuit when a balanced three-phase voltage is applied to the circuit, and means for connecting the measuring instrument across the points of equal potential.

2. In a three-phase electrical circuit, the combination with an electro-responsive device, of two secondary transformer windings so connected that the currents traversing the same are sixty degrees out of phase, two impedance means connected across the windings, and means for connecting the electro-responsive device from a point between the impedance means and a point between the windings.

3. A measuring network for an unbalanced three-phase circuit comprising two transformers the primary windings of which are connected in open-delta to the circuit, two impedance devices of different phase characteristics connected in series with the secondary windings of the transformers, and a voltmeter connected from a point between the impedances to a point between the secondary windings one of which is reversed to obtain a phase difference therebetween of sixty degrees.

4. The combination with a polyphase circuit, of means including a static network comprising a plurality of impedance devices, said means being connected to less than all of the circuit conductors, and the devices being so connected to the network and having such characteristics that, under balanced conditions in the circuit, predetermined points of the network will have the same relative potentials as a predetermined conductor of the circuit to which conductor the network is not connected, and electro-responsive means connected between said points of the network to be subjected to the potential difference between said points of the network when the circuit conditions are unbalanced, said potential difference being a measure of the unbalance of the circuit.

5. The combination with an N-phase circuit, of a static network connected thereto comprising a plurality of impedances differing in phase characteristics by an angle that is correlated to the number of phases in the circuit, and a device so connected to the network as to be influenced by a force that is proportional to one symmetrical component of an electrical quantity of the circuit.

6. The combination with a polyphase circuit and an electro-responsive device, of means for energizing said device in accordance with a symmetrical component of the voltage of the circuit comprising two equal impedances of different phase characteristics connected together and subjected to the voltages of two separate phases of the circuit, the common point of said impedances being connected to said device.

7. The combination with a three-phase circuit and an electro-responsive device, of two potential transformers connected across two phases of said circuit, two equal impedances differing in phase by 60° connected together and to said transformers, and connections between said device and the common point of said impedances.

8. The combination with a polyphase circuit and an electro-responsive device, of two potential transformers connected across two phases of said circuit, two equal impedances differing in phase by an angle equal to the phase displacement of the voltages of said two phases under balanced conditions when one of said voltages is reversed in sign, said impedances being connected together and to said transformers, and connections between said device and the common point of said impedances to energize said device in accordance with one phase-sequence component of the voltage of said circuit.

In testimony whereof, I have hereunto subscribed my name this 13th day of March 1920.

CHESTER T. ALLCUTT.